United States Patent
Lemmers, Jr.

(10) Patent No.: US 9,574,618 B2
(45) Date of Patent: Feb. 21, 2017

(54) THERMAL DISCONNECT ASSEMBLY WITH FLIGHT CONTROL PERMANENT MAGNET GENERATOR FOR INTEGRATED DRIVE GENERATOR

(71) Applicant: Hamilton Sundstrand Corporation, Charlotte, NC (US)

(72) Inventor: Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 161 days.

(21) Appl. No.: 14/548,665

(22) Filed: Nov. 20, 2014

(65) Prior Publication Data

US 2016/0146264 A1    May 26, 2016

(51) Int. Cl.
  *F16D 27/105* (2006.01)
  *F16D 9/02* (2006.01)

(52) U.S. Cl.
  CPC ....................... *F16D 9/02* (2013.01)

(58) Field of Classification Search
  CPC ............. B66F 9/07572; B66F 9/07509; B60W 10/103; B60W 10/184; B60W 10/06; B60W 30/192; B60W 2300/121; B60W 2540/12; E02F 9/2246; E02F 9/2253; E02F 9/2296; B60T 13/662; B60Y 2200/15; F16H 61/4157; F16D 43/25; F16D 43/20; F16D 11/14; F16D 23/12; F16D 9/00; F16D 9/02
  See application file for complete search history.

(56) References Cited

U.S. PATENT DOCUMENTS

| | | | | |
|---|---|---|---|---|
| 3,889,789 A | * | 6/1975 | Boehringer | F16D 9/02 192/82 T |
| 4,086,991 A | | 5/1978 | Swadley | |
| 4,271,947 A | * | 6/1981 | Gaeckle | F16D 9/02 192/101 |
| 4,934,977 A | * | 6/1990 | Falconer | F16D 11/14 192/82 T |

(Continued)

FOREIGN PATENT DOCUMENTS

| EP | 1170522 A1 | 1/2012 |
|---|---|---|
| EP | 1229262 B1 | 1/2014 |

(Continued)

OTHER PUBLICATIONS

Extended European Search Report dated Apr. 6, 2016, for corresponding European Application No. 15195588.7.

*Primary Examiner* — David J Hlavka
(74) *Attorney, Agent, or Firm* — Kinney & Lange, P.A.

(57) ABSTRACT

A thermal disconnect assembly for an integrated drive generator includes an input shaft, an output shaft, a eutectic solder, and a disconnect clutch. The input shaft is driven by an external mechanical source. The output shaft is coupled to the input shaft through a disconnect clutch in a coupled state, is driven by the input shaft and rotates with the input shaft in the coupled state. The eutectic solder is configured to hold the output shaft in the coupled state and melt upon reaching a threshold temperature. The disconnect clutch is configured to urge the output shaft toward a decoupled state upon melting of the eutectic solder such that the output shaft does not rotate with the input shaft in the decoupled state.

9 Claims, 3 Drawing Sheets

(56) References Cited

U.S. PATENT DOCUMENTS

| | | | | |
|---|---|---|---|---|
| 5,103,949 | A * | 4/1992 | Vanderzyden | F16D 9/02 192/101 |
| 6,364,772 | B1 * | 4/2002 | Sugden | F16D 9/02 165/96 |
| 6,619,454 | B2 * | 9/2003 | Hayward | F16D 9/02 192/40 |
| 6,938,746 | B2 * | 9/2005 | Skorucak | F16D 27/118 192/101 |
| 7,296,670 | B2 * | 11/2007 | Howard | F16D 9/02 192/144 |
| 8,225,919 | B2 * | 7/2012 | Harris | F16D 11/14 192/101 |
| 2011/0001375 | A1 * | 1/2011 | Lemmers, Jr. | H02K 7/083 310/78 |
| 2014/0008170 | A1 | 1/2014 | Vanderzyden et al. | |

FOREIGN PATENT DOCUMENTS

| | | |
|---|---|---|
| GB | 1600977 | 10/1981 |
| WO | 87/03057 | 5/1987 |

\* cited by examiner

THERMAL DISCONNECT ASSEMBLY WITH FLIGHT CONTROL PERMANENT MAGNET GENERATOR FOR INTEGRATED DRIVE GENERATOR

BACKGROUND

The present invention relates generally to integrated drive generators, and in particular to a thermal disconnect for an integrated drive generator.

Gas turbine engines, for example, often include generators that provide variable frequency output power. Integrated drive generators (IDGs) have been implemented in addition to the variable frequency generators to provide constant frequency output power. IDGs, which are driven, for example, by an input shaft from the turbine engine, typically include a generator, a differential gear assembly and a hydraulic speed trimming device. The speed trimming device is utilized to control the speed of the generator in relation to the mechanical input to the IDG such that the generator rotates at a constant speed. Failures may occur during operation of the IDG that cause excessive temperatures within the IDG. It is desirable to decouple the IDG from the gas turbine engine upon occurrence of a failure in order to prevent further failures and degradation of the system.

SUMMARY

A thermal disconnect assembly for an integrated drive generator includes an input shaft, an output shaft, a eutectic solder, and a disconnect clutch. The input shaft is driven by an external mechanical source. The output shaft is coupled to the input shaft through a disconnect clutch in a coupled state, is driven by the input shaft and rotates with the input shaft in the coupled state. The eutectic solder is configured to hold the output shaft in the coupled state and melt upon reaching a threshold temperature. The disconnect clutch is configured to urge the output shaft toward a decoupled state upon melting of the eutectic solder such that the output shaft does not rotate with the input shaft in the decoupled state.

A method of disconnecting an input shaft from an output shaft of an integrated drive generator includes holding, using a eutectic solder, the input shaft and the output shaft in a coupled state; driving, by a mechanical power source, the input shaft such that the input shaft rotates about a first axis; driving, by the input shaft, the output shaft in the coupled state; melting the eutectic solder upon a temperature of the eutectic solder reaching a threshold value; and moving, using a disconnect clutch, the output shaft axially away from the input shaft to a decoupled state upon melting of the eutectic solder.

DETAILED DESCRIPTION

A thermal disconnect assembly with a flight control permanent magnet generator (PMG) for an integrated drive generator (IDG) is disclosed herein that provides disconnection of the IDG from an input shaft upon occurrence of a failure condition. The thermal disconnect assembly includes an output shaft, eutectic solder, and disconnect clutch. The input shaft is driven by an external mechanical source. The output shaft is coupled to the input shaft through a disconnect clutch when in a coupled state. The output shaft is driven by the input shaft and rotates with the input shaft while in the coupled state. The output shaft drives the flight control PMG through an output gear assembly that also drives the IDG. The eutectic solder is configured to hold the output shaft in the coupled state and melt upon reaching a threshold temperature. The disconnect clutch is configured to urge the output shaft toward a decoupled state upon melting of the eutectic solder. The output shaft does not rotate with the input shaft in the decoupled state. This way, the IDG is disconnected from the input mechanical source upon occurrence of a failure within the IDG, preventing further failures and degradation of the system.

Figure 1:
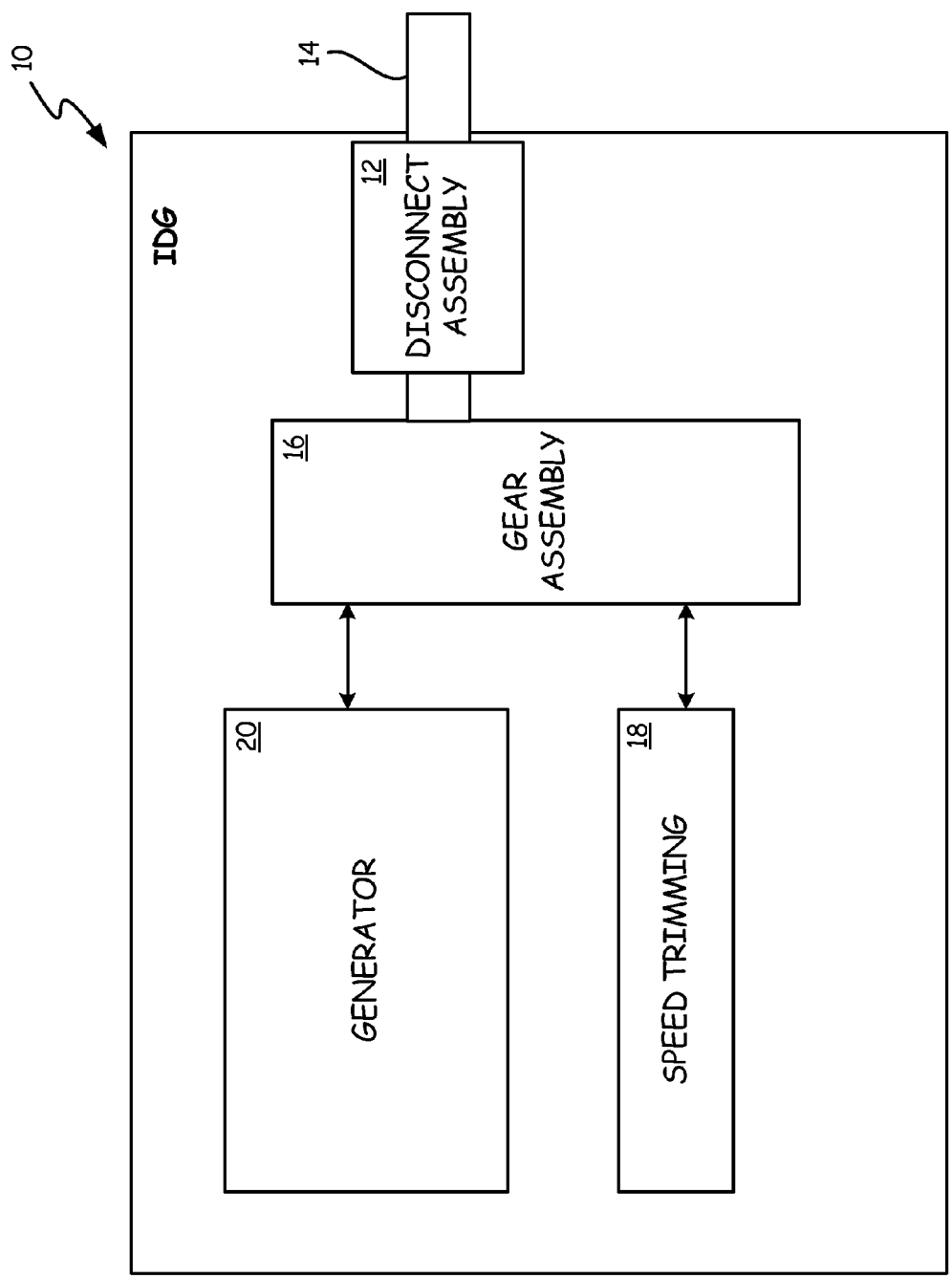
FIG. 1 is a block diagram illustrating an integrated drive generator (IDG) that includes a disconnect assembly.

FIG. 1 is a block diagram illustrating integrated drive generator (IDG) 10 that includes disconnect assembly 12. IDG 10 includes disconnect assembly 12, input shaft 14, gear assembly 16, speed limiter 18, and generator 20. IDG 10 may be utilized, for example, in an aircraft to provide constant frequency output power. IDG 10 is configured to receive rotational energy on input shaft 14 at, for example, varying rotational speeds from a prime mover (not illustrated) such as a gas turbine engine accessory gear box.

Generator 20 produces an electrical output having, for example, a constant output frequency, such as 3-phase 115 Volt (V) alternating current (AC) at 400 Hertz (Hz). In order to produce an output with a constant frequency, generator 20 rotates at a constant speed. Speed limiter 18, which may be a hydraulic speed trimming device, for example, may be located proximate to generator 20. Speed limiter 18 may hydro-mechanically regulate the speed of rotational energy provided to generator 20. In particular, regardless of variations in the rotational speed of input shaft 14, speed limiter 18 may be configured to provide rotational energy that adds or subtracts speed through gear assembly 16 to input shaft 14 so that the speed of generator 20 is constant. Gear assembly 16 may be, for example, an epicyclic differential gear system.

Gear assembly 16 is operably coupled to speed trimming device 18 and forms a gear relationship with generator 20, speed trimming device 18, and input shaft 14 through disconnect assembly 12. Each of generator 20, speed trimming device 18 and gear assembly 16 may be disposed about, for example, separate centerlines dependent upon design considerations. Input shaft 14 and disconnect assembly 12 may be oriented about the same centerline.

Faults may occur within IDG 10 that may, for example, increase the temperature within IDG 10. These increases in temperature may be caused by, for example, too much oil within IDG 10, a short in the windings of generator 20, or any other failure/condition that raises the temperature within IDG 10. Disconnect assembly 12 is utilized to disconnect IDG 10 from the external system through input shaft 14 in order to prevent further failures or damage to IDG 10 and the external system.

Figure 2A:
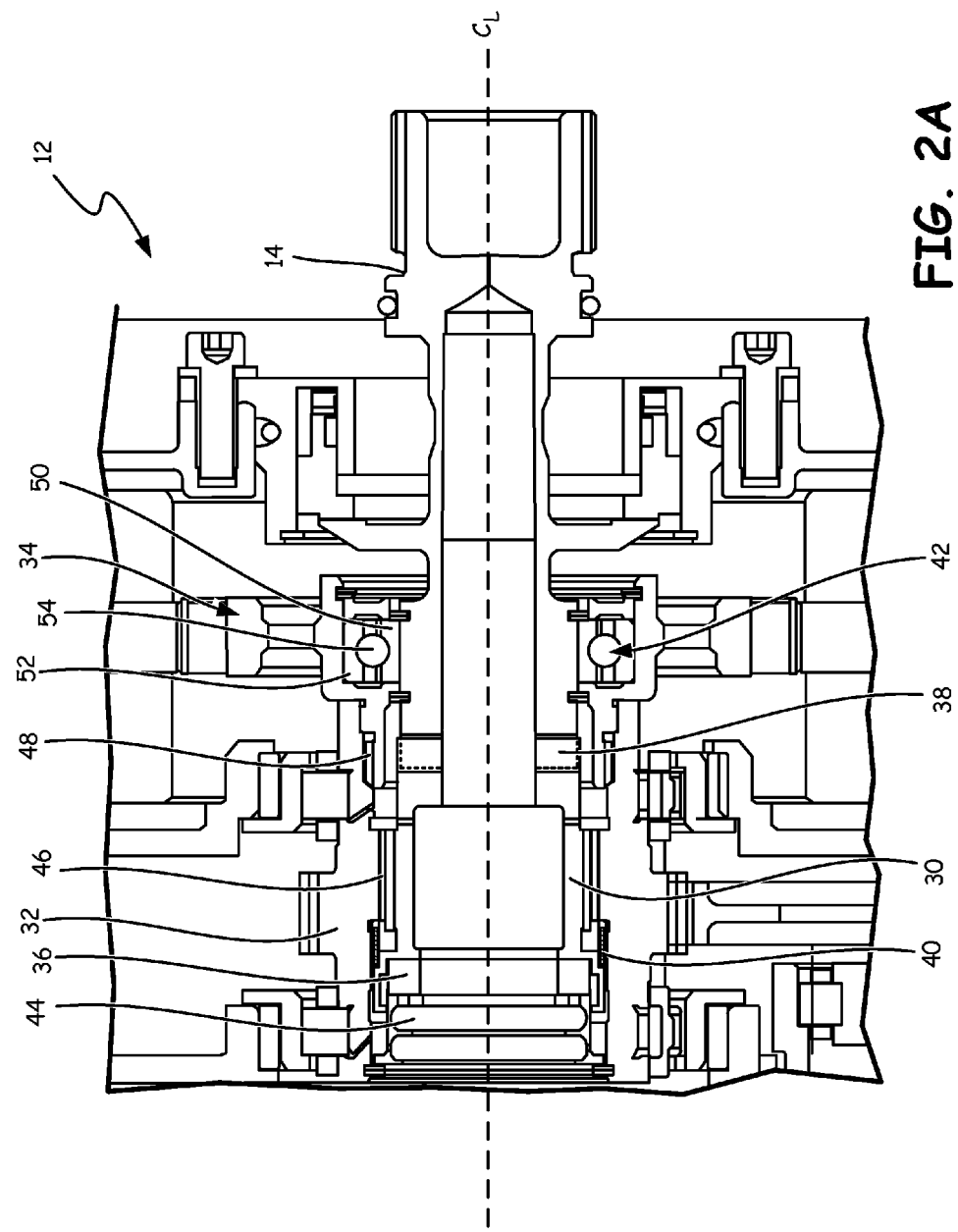
FIGS. 2A and 2B are cross-sectional views illustrating a disconnect assembly for an integrated drive generator (IDG) in a connected and disconnected configuration, respectively.
Figure 2B:
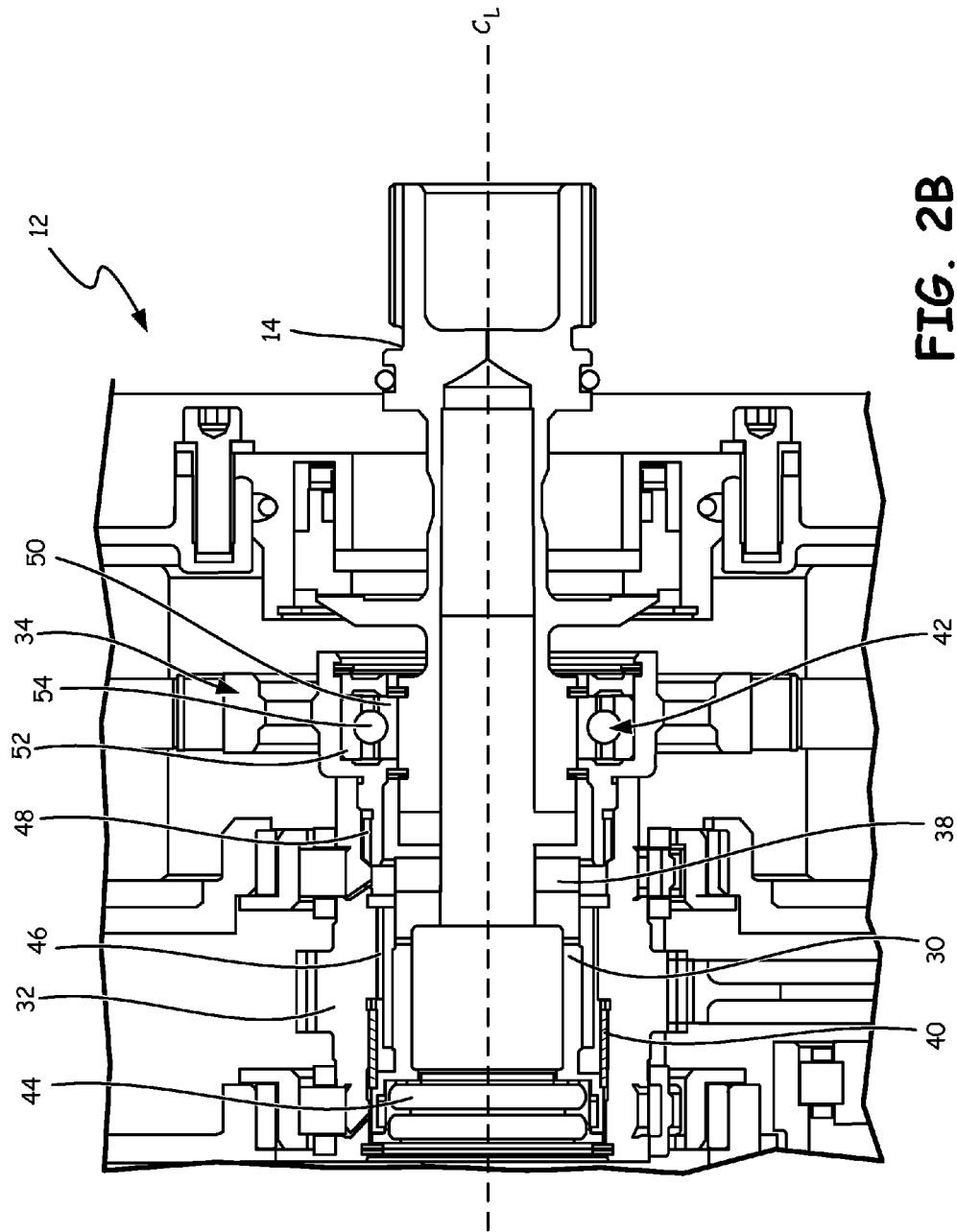

FIGS. 2A and 2B are cross-sectional views illustrating disconnect assembly 12 for an integrated drive generator (IDG) in a coupled and decoupled state, respectively. Disconnect assembly 12 includes input shaft 14, output shaft 30, output gear 32, flight control permanent magnet generator (PMG) 34, eutectic solder 36, disconnect clutch 38, spring 40, disconnect bearing 42, and molten solder collector 44. Output shaft 30 and output gear 32 are coupled through spline 46. Output gear 32 and flight control PMG 34 are coupled through thread 48. Disconnect bearing 42 includes inner race 50, outer race 52, and ball bearings 54. Input shaft 14 and output shaft 30 are oriented about centerline $C_L$.

FIG. 2A illustrates disconnect assembly 12 in a coupled state. In the coupled state, eutectic solder 36, which is annular about centerline $C_L$, biases output shaft 30 such that output shaft 30 is held coupled to input shaft 14 through disconnect clutch 38. Disconnect clutch 38, which may also be referred to as a disconnect jaws, may be any known disconnect clutch such as, for example, a face clutch. Face clutches are configured, for example, with angles (not shown) such that output shaft 30 is urged away from input shaft 14 during the transfer of rotational energy. Eutectic solder 36 prevents this separation from occurring during normal system operation in the coupled state.

While output shaft 30 is coupled to input shaft 14 through disconnect clutch 38, output shaft 30 is driven by, and rotates with, input shaft 14. Output shaft 30 is coupled to output gear 32 through spline 46 and thus, output gear 32 rotates with output shaft 30. Output gear 32 is coupled to drive the rest of gear assembly 16 (FIG. 1). Output gear 32 is also coupled to drive flight control PMG 34 through thread 48.

Flight control PMG 34 is operably driven by output shaft 30 and is utilized to provide, for example, dedicated variable frequency output power. This output power may be utilized, for example, to provide power for any aircraft systems that desire dedicated power such as flight control avionics. By mounting flight control PMG 34 annularly about input shaft 14 within IDG 10, the weight and envelope of flight control PMG 34 is reduced over previous designs that may have been located, for example, within the primary engine (not shown). Further, by mounting flight control PMG 34 in this location, the overall envelope of IDG 10 is not increased.

Flight control PMG 34 is configured to support input shaft 14 through disconnect bearing 42. While in the coupled state, inner race 50 and outer race 52 rotate together. This eliminates contact fatigue degradation of disconnect bearing 42 while input shaft 14 and output shaft 30 are in the coupled state which increases the life of disconnect bearing 42.

Eutectic solder 36 is configured to melt upon reaching a threshold temperature. Eutectic solder 36 may be made of any suitable material such as, for example, tin alloy, which may have a melting point of three hundred ninety-four degrees Fahrenheit (F). At temperatures below the threshold temperature, eutectic solder 36 remains solid and holds output shaft 30 in the coupled state. Eutectic solder 36 is annular about centerline $C_L$ and positioned between output shaft 30 and molten solder collector 44. Upon the temperature reaching the threshold temperature, eutectic solder 36 melts. Upon melting of eutectic solder 36, disconnect clutch 38 and spring 40 urge output shaft 30 in the axial direction away from input shaft 14, disconnecting output shaft 30 from input shaft 14. Spline 46 permits output shaft 30 to move axially toward solder collector 44 while remaining coupled to output gear 32.

FIG. 2B illustrates disconnect assembly 12 in a decoupled state. Output shaft 30 is no longer coupled to input shaft 14 through disconnect clutch 38. Therefore, input shaft 14 rotates while output shaft 30 remains stationary relative to input shaft 14. Because of this, IDG 10 receives no mechanical input power and produces no electrical output power, which prevents further damage and degradation to IDG 10. The molten eutectic solder is collected by molten solder collector 44. Upon initial melting of eutectic solder 36, the rotational energy of output shaft 30 forces eutectic solder 36 into molten solder collector 44 as it melts. Molten solder collector 44 is configured, for example, such that eutectic solder 36 is held in place when solid, and is collected into molten solder collector 44 when melted.

Annular spring 40 is extended in the decoupled state and holds output shaft 30 in the decoupled state. Spring 40 is implemented, for example, between a ridge on an outer surface of output shaft 30 and a ridge in the inner surface of output gear 32. When extended, spring 40 inhibits motion of output shaft 30 in the axial direction toward input shaft 14, ensuring that output shaft 30 remains decoupled from input shaft 40.

Flight control PMG 34, because it is coupled to output gear 32, also ceases to rotate in the decoupled state. In the coupled state, flight control PMG 34 continues to provide support for input shaft 14. While flight control PMG 34 is stationary relative to input shaft 14, inner race 50 rotates with input shaft 14, while ball bearings 54 allow outer race 52 to remain stationary relative to inner race 50. In this way, IDG 10 may be disconnected from the prime mover (not shown) and remain disconnected for any desirable time period.

Discussion of Possible Embodiments

The following are non-exclusive descriptions of possible embodiments of the present invention.

A thermal disconnect assembly for an integrated drive generator includes an input shaft, an output shaft, a eutectic solder, and a disconnect clutch. The input shaft is driven by an external mechanical source. The output shaft is coupled to the input shaft through a disconnect clutch in a coupled state, is driven by the input shaft and rotates with the input shaft in the coupled state. The eutectic solder is configured to hold the output shaft in the coupled state and melt upon reaching a threshold temperature. The disconnect clutch is configured to urge the output shaft toward a decoupled state upon melting of the eutectic solder such that the output shaft does not rotate with the input shaft in the decoupled state.

The thermal disconnect assembly of the preceding paragraph can optionally include, additionally and/or alternatively, any one or more of the following features, configurations and/or additional components:

A further embodiment of the foregoing thermal disconnect assembly, wherein the input shaft and the output shaft are oriented about a common centerline, and wherein the output shaft is configured to move axially along the centerline upon melting of the eutectic solder.

A further embodiment of any of the foregoing thermal disconnect assemblies, further including a flight control permanent magnet generator operably coupled to rotate with the output shaft, wherein the flight control generator is located annularly about the input shaft.

A further embodiment of any of the foregoing thermal disconnect assemblies, wherein the flight control permanent magnet generator is further coupled to the input shaft through a disconnect bearing.

A further embodiment of any of the foregoing thermal disconnect assemblies, wherein the disconnect bearing includes an inner race coupled to the input shaft and configured to rotate with the input shaft, an outer race coupled to the flight control permanent magnet generator and configured to rotate with the flight control permanent magnet generator, wherein the outer race is coupled to the inner race through ball bearings, and wherein the outer race and the inner race rotate together in the coupled state, and wherein the inner race rotates relative to the outer race in the decoupled state.

A further embodiment of any of the foregoing thermal disconnect assemblies, wherein the flight control permanent magnet generator is operably coupled to rotate with the output shaft through an output gear.

A further embodiment of any of the foregoing thermal disconnect assemblies, wherein the output gear is coupled to the output shaft through a spline.

A further embodiment of any of the foregoing thermal disconnect assemblies, further comprising a spring that biases the output shaft to the decoupled state upon melting of the eutectic solder.

A further embodiment of any of the foregoing thermal disconnect assemblies, further comprising a solder collector, wherein the spring biases the output shaft into the solder collector in the decoupled state to collect the eutectic solder.

A method of disconnecting an input shaft from an output shaft of an integrated drive generator includes holding, using a eutectic solder, the input shaft and the output shaft in a coupled state; driving, by a mechanical power source, the input shaft such that the input shaft rotates about a first axis; driving, by the input shaft, the output shaft in the coupled state; melting the eutectic solder upon a temperature of the eutectic solder reaching a threshold value; and moving, using a disconnect clutch, the output shaft axially away from the input shaft to a decoupled state upon melting of the eutectic solder.

The method of the preceding paragraph can optionally include, additionally and/or alternatively, any one or more of the following features, configurations and/or additional components:

A further embodiment of the foregoing method, wherein driving, by the input shaft, the output shaft further includes driving, by the output shaft, a permanent magnet generator oriented annularly about the input shaft, wherein the permanent magnet generator is coupled to the input shaft through a disconnect bearing.

A further embodiment of any of the foregoing methods, wherein driving, by the output shaft, the permanent magnet generator comprises rotating an outer race of the disconnect bearing together with an inner race of the disconnect bearing.

A further embodiment of any of the foregoing methods, further including rotating the inner race of the disconnect bearing relative to the outer race of the disconnect bearing in the decoupled state.

A further embodiment of any of the foregoing methods, further including biasing, using a spring, the output shaft axially away from the input shaft to hold the output shaft in the decoupled state.

A further embodiment of any of the foregoing methods, further including collecting, using a solder collector, the melted eutectic solder, wherein the output shaft moves axially toward the solder collector to force the melted eutectic solder into the solder collector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A thermal disconnect assembly for an integrated drive generator, the thermal disconnect assembly comprising:
   an input shaft driven by an external mechanical source;
   an output shaft coupled to the input shaft through a disconnect clutch in a coupled state, wherein the output shaft is driven by the input shaft and rotates with the input shaft in the coupled state;
   a eutectic solder configured to hold the output shaft in the coupled state, wherein the eutectic solder is configured to melt upon reaching a threshold temperature; and
   a flight control permanent magnet generator operably coupled to rotate with the output shaft, wherein the flight control generator is located annularly about the input shaft and is coupled to the input shaft through a disconnect bearing, and wherein the disconnect bearing comprises:
      an inner race coupled to the input shaft and configured to rotate with the input shaft;
      an outer race coupled to the flight control permanent magnet generator and configured to rotate with the flight control permanent magnet generator, wherein the outer race is coupled to the inner race through ball bearings; and
      wherein the outer race and the inner race rotate together in the coupled state, and wherein the inner race rotates relative to the outer race in the decoupled state; and
   wherein the disconnect clutch is configured to urge the output shaft toward a decoupled state upon melting of the eutectic solder, and wherein the output shaft does not rotate with the input shaft in the decoupled state.

2. The thermal disconnect assembly of claim 1, wherein the input shaft and the output shaft are oriented about a common centerline, and wherein the output shaft is configured to move axially along the centerline upon melting of the eutectic solder.

3. The thermal disconnect assembly of claim 1, wherein the flight control permanent magnet generator is operably coupled to rotate with the output shaft through an output gear.

4. The thermal disconnect assembly of claim 3, wherein the output gear is coupled to the output shaft through a spline.

5. The thermal disconnect assembly of claim 1, further comprising a spring that biases the output shaft to the decoupled state upon melting of the eutectic solder.

6. The thermal disconnect assembly of claim 5, further comprising a solder collector, wherein the spring biases the output shaft into the solder collector in the decoupled state to collect the eutectic solder.

7. A method of disconnecting an input shaft from an output shaft of an integrated drive generator, the method comprising:
   holding, using a eutectic solder, the input shaft and the output shaft in a coupled state;
   driving, by a mechanical power source, the input shaft, wherein the input shaft rotates about a first axis;
   driving, by the input shaft, the output shaft in the coupled state;
   driving, by the output shaft, a permanent magnet generator oriented annularly about the input shaft, wherein the permanent magnet generator is coupled to the input shaft through a disconnect bearing;
   rotating an outer race of the disconnect bearing together with an inner race of the disconnect bearing;
   melting the eutectic solder upon a temperature of the eutectic solder reaching a threshold value;

moving, using a disconnect clutch, the output shaft axially away from the input shaft to a decoupled state upon melting of the eutectic solder; and rotating the inner race of the disconnect bearing relative to the outer race of the disconnect bearing in the decoupled state.

8. The method of claim 7, further comprising:

biasing, using a spring, the output shaft axially away from the input shaft to hold the output shaft in the decoupled state.

9. The method of claim 7, further comprising:

collecting, using a solder collector, the melted eutectic solder, wherein the output shaft moves axially toward the solder collector to force the melted eutectic solder into the solder collector.

* * * * *